No. 636,836. Patented Nov. 14, 1899.
LA VERNE W. NOYES.
OILING DEVICE FOR WINDMILLS.
(Application filed Feb. 16, 1899.)
(No Model.)
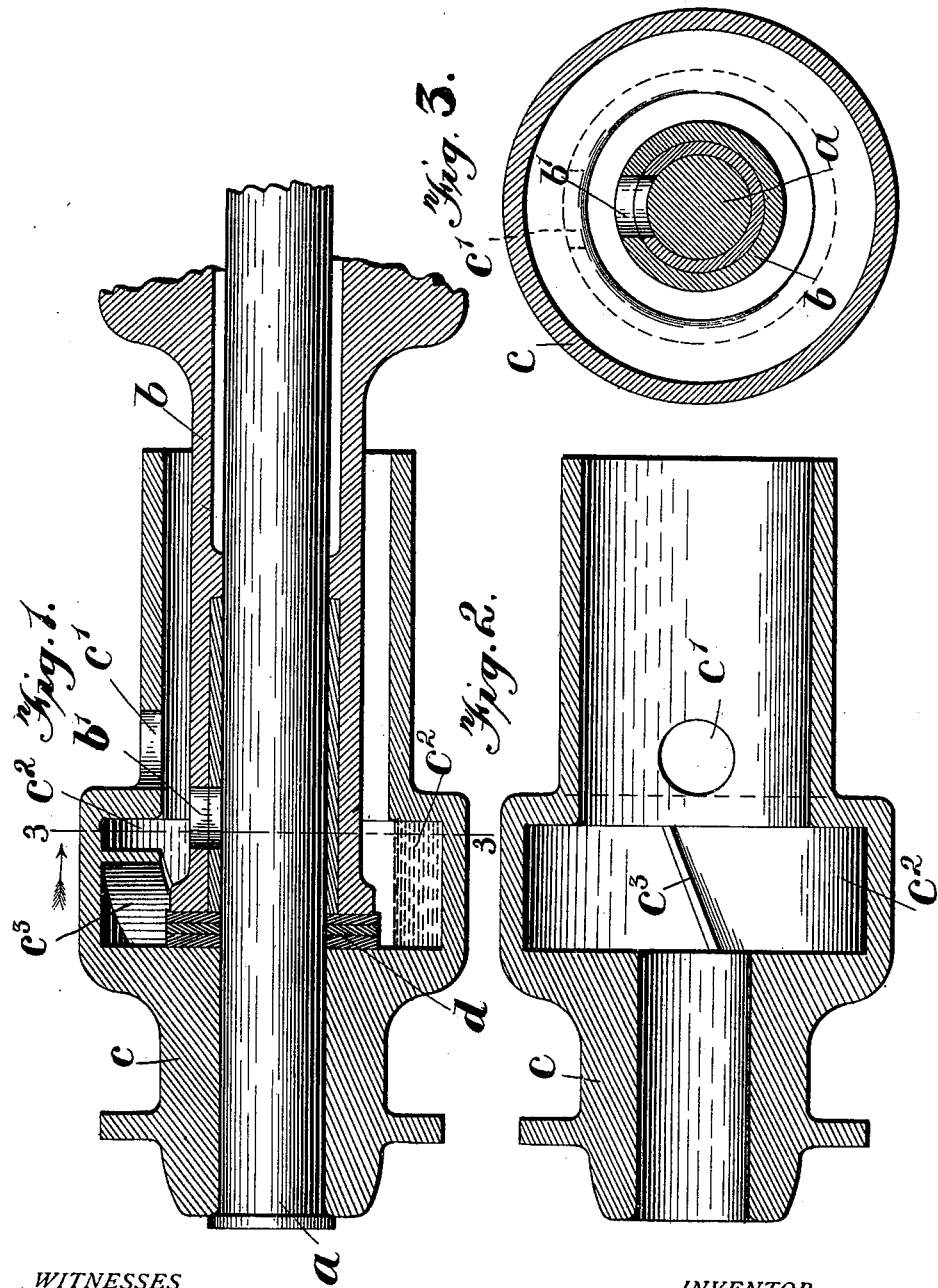

UNITED STATES PATENT OFFICE.

LA VERNE W. NOYES, OF CHICAGO, ILLINOIS.

OILING DEVICE FOR WINDMILLS.

SPECIFICATION forming part of Letters Patent No. 636,836, dated November 14, 1899.

Application filed February 16, 1899. Serial No. 705,596. (No model.)

*To all whom it may concern:*

Be it known that I, LA VERNE W. NOYES, a citizen of the United States, residing at Chicago, in the county of Cook and State of Illinois, have invented a certain new and useful Improvement in Oiling Devices for Windmills, of which the following is a full, clear, concise, and exact description, reference being had to the accompanying drawings, forming a part of this specification.

My invention relates to an oiling device for bearings, my object being more particularly to provide efficient means for supplying oil continuously to an end-thrust bearing, although it is applicable to other forms of bearings.

In accordance with my invention I provide upon the rotating part an annular channel or pocket adapted to receive oil, which is carried up by the walls of the channel during the revolution, and thereby is passed to the bearing to be lubricated. In order to insure the effective raising of the oil, I provide around the walls of the channel one or more partitions extending inward and adapted during the revolution to dip into and lift the oil, which in dropping passes to the bearing. In order that the oil may be passed to one side or the other of the channel, as desired, the partition may be arranged oblique, whereby the oil engaging the oblique surface is caused to pass to the side of the channel.

I have illustrated my invention in the accompanying drawings, in which—

Figure 1 is a sectional view of the hub and bearing of a windmill-wheel embodying my invention. Fig. 2 is a sectional view of the hub. Fig. 3 is a sectional view on line 3 3, Fig. 1.

Like letters refer to like parts in the several figures.

The axle or shaft $a$ is journaled in the bearing-sleeve $b$, mounted upon the turn-table (not shown) of the windmill, and upon the shaft $a$ the wind-wheel hub $c$ is mounted and secured. Between the inner face of the hub and the end of the sleeve a set of washers $d$ is placed, whereby the end of the sleeve serves to take up the end thrust of the wheel-hub. The hub is extended in shell-like form to constitute a shell $c^4$, surrounding the sleeve $b$, and oil-holes $b'$ $c'$ are provided in the sleeve and hub, respectively, whereby the bearing of the shaft $a$ may be lubricated. The shell of the hub is outwardly expanded to form an annular channel or pocket $c^2$, to which a body of oil may be admitted through oil-hole $c'$. Extending inward from the wall of the channel a partition $c^3$ is provided, which is oblique to the axis of rotation of the shell. As the shell rotates the oil therein is carried upward by the walls of the channel and in dropping passes to the end-thrust bearing, as well as to the oil-hole $b'$. The partition $c^3$ serves in a more marked degree to dip the oil and raise it, permitting it to drop upon the desired parts to be lubricated, and the obliqueness of the partition causes the oil to pass along the oblique face to the side of the channel which is in the plane of the end-thrust bearing, thereby insuring the passage of the oil to the desired position.

While I have illustrated my invention in connection with a specific form of bearing, it will be found equally applicable to bearings of other form.

Having described my invention, what I claim as new is—

1. The combination with a bearing-sleeve, of a rotating part journaled therein and having a portion rotating about said sleeve and provided with an annular channel for the reception of oil and having a partition therein extending oblique to the axis of rotation of said part, substantially as described.

2. The combination with a bearing-sleeve, of a shaft journaled therein, a hub or part mounted on said shaft and having an end-thrust bearing against said sleeve and also having an annular channel, for the reception of oil, surrounding said end-thrust bearing, substantially as described.

3. The combination with a bearing-sleeve, of a shaft journaled therein, a hub or part mounted on said shaft and having an end-thrust bearing against said sleeve, and a shell rotating with said hub or part and provided with an annular channel surrounding said end-thrust bearing, substantially as described.

In witness whereof I have hereunto subscribed my name in the presence of two witnesses.

LA VERNE W. NOYES.

Witnesses:
PERCY C. GILL,
W. CLYDE JONES.